US010302331B2

(12) United States Patent
Kohl et al.

(10) Patent No.: US 10,302,331 B2
(45) Date of Patent: May 28, 2019

(54) HEATING DEVICE

(71) Applicants: Behr-Hella Thermocontrol GmbH, Lippstadt (DE); MAHLE International GmbH, Stuttgart (DE)

(72) Inventors: Michael Kohl, Bietigheim-Bissingen (DE); Karl-Gerd Krumbach, Burgstetten (DE); Karl Lochmahr, Vaihingen/Enz (DE); Wolfgang Seewald, Tamm (DE); Olivier Schunck, Thanville (FR); Dirk Nagel, Paderborn (DE); Lars Heeper, Paderborn (DE); Matthias Stallein, Rietberg (DE); Michael Steinkamp, Lippstadt (DE); Karsten Marquas, Arnsberg (DE); Volker Dicke, Bestwig-Heringhausen (DE)

(73) Assignees: MAHLE International GmbH, Stuttgart (DE); Behr-Hella Thermocontrol GmbH, Lippstadt (DE)

( * ) Notice: Subject to any disclaimer, the term of this patent is extended or adjusted under 35 U.S.C. 154(b) by 320 days.

(21) Appl. No.: 14/605,370

(22) Filed: Jan. 26, 2015

(65) Prior Publication Data

US 2015/0131979 A1    May 14, 2015

Related U.S. Application Data

(63) Continuation of application No. PCT/EP2013/065630, filed on Jul. 24, 2013.

(30) Foreign Application Priority Data

Jul. 24, 2012 (EP) .................................... 12290255

(51) Int. Cl.
*F24H 1/10* (2006.01)
*F24H 1/12* (2006.01)
(Continued)

(52) U.S. Cl.
CPC ........... *F24H 1/121* (2013.01); *B60H 1/2221* (2013.01); *F24H 9/14* (2013.01); *F24H 9/1818* (2013.01);
(Continued)

(58) Field of Classification Search
CPC ...... F24H 1/121; B60H 1/2221; H05B 1/0283
(Continued)

(56) References Cited

U.S. PATENT DOCUMENTS

| 4,508,957 A | * | 4/1985 | Rocchitelli ............. B60S 1/481 137/341 |
| 5,727,118 A | | 3/1998 | Roussel et al. |

(Continued)

FOREIGN PATENT DOCUMENTS

| WO | WO 2011/052874 A1 | 5/2011 |
| WO | WO 2011/085915 A1 | 7/2011 |
| WO | WO 2012/101273 A1 | 8/2012 |

*Primary Examiner* — Tu B Hoang
*Assistant Examiner* — Erin E McGrath
(74) *Attorney, Agent, or Firm* — Muncy, Geissler, Olds & Lowe, P.C.

(57) ABSTRACT

A heating device is provided with plates stacked one on top of another. At least one first fluid channel is formed in a fluid-tight manner between a first plate package with a first and a second plate. An electrical heating element is arranged between a first plate of the first plate package and an additional plate. The electrical heating element is accommodated between the two plates in a sealed manner and is electrically insulated, wherein an inlet-side and an outlet side fluid connection of the first fluid channel is arranged on the second plate of the first plate package. The electrical heating element has a connection device for electrical contacting, which is connected to the electrical heating element and protrudes through a window in the second plate of the first plate package, wherein the fluid connections and the
(Continued)

window are arranged adjacent to opposing lateral edges of the second plate.

16 Claims, 5 Drawing Sheets

(51) Int. Cl.
*B60H 1/22* (2006.01)
*H05B 1/02* (2006.01)
*F24H 9/14* (2006.01)
*F24H 9/18* (2006.01)

(52) U.S. Cl.
CPC ... *H05B 1/0283* (2013.01); *B60H 2001/2271* (2013.01); *B60H 2001/2278* (2013.01)

(58) Field of Classification Search
USPC ............ 392/314, 461, 479, 465; 137/341; 219/202, 203, 205
See application file for complete search history.

(56) References Cited

U.S. PATENT DOCUMENTS

| | | | | |
|---|---|---|---|---|
| 5,913,361 A | * | 6/1999 | Engstrom | F28D 9/005 165/167 |
| 2010/0296800 A1 | * | 11/2010 | Min | F24H 1/121 392/468 |
| 2011/0180617 A1 | * | 7/2011 | Saito | B60H 1/2221 236/49.3 |
| 2011/0197384 A1 | * | 8/2011 | Grandjean | B60S 1/488 15/250.01 |
| 2012/0193339 A1 | * | 8/2012 | Adachi | B60H 1/2221 219/202 |

\* cited by examiner

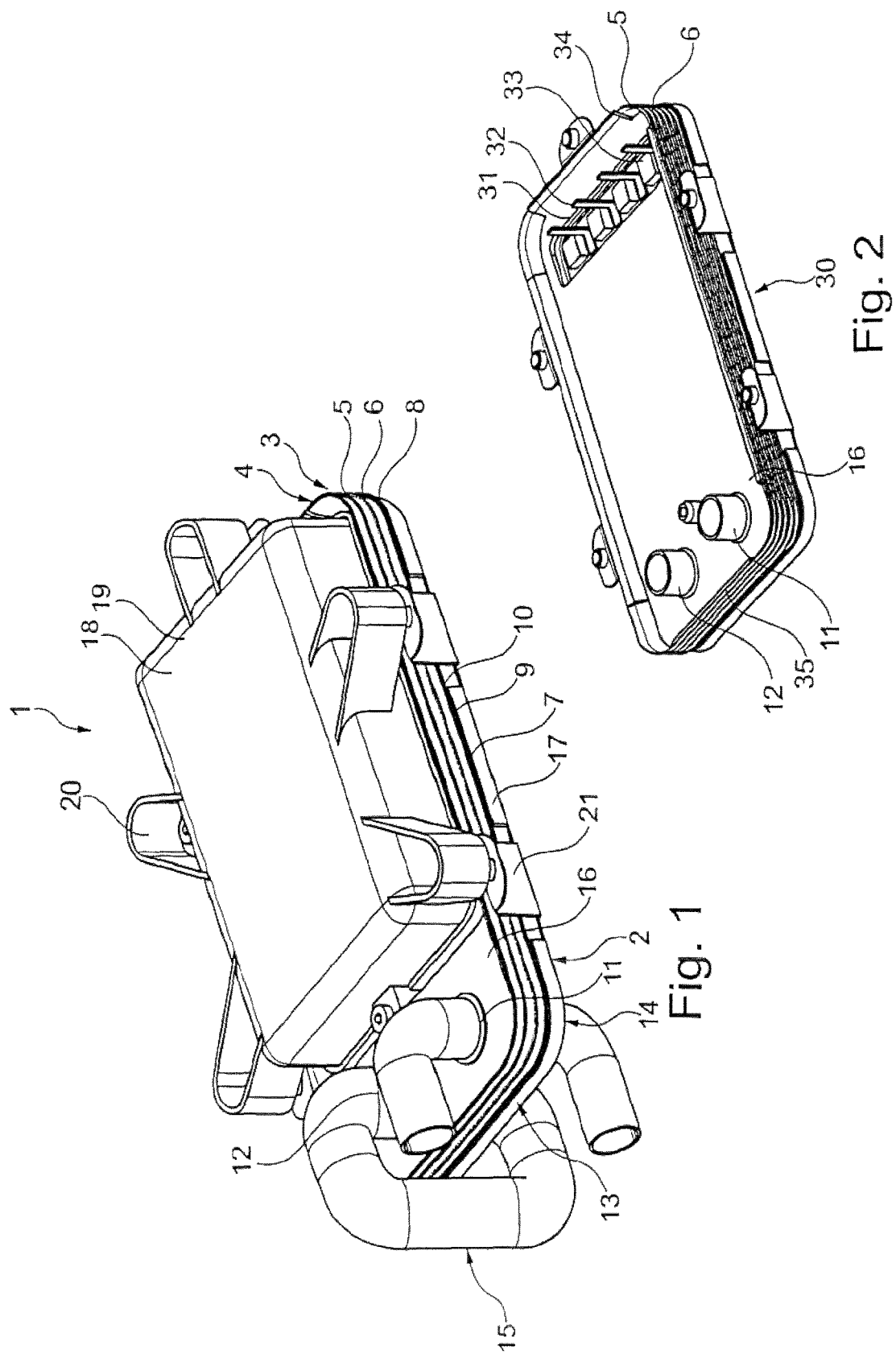

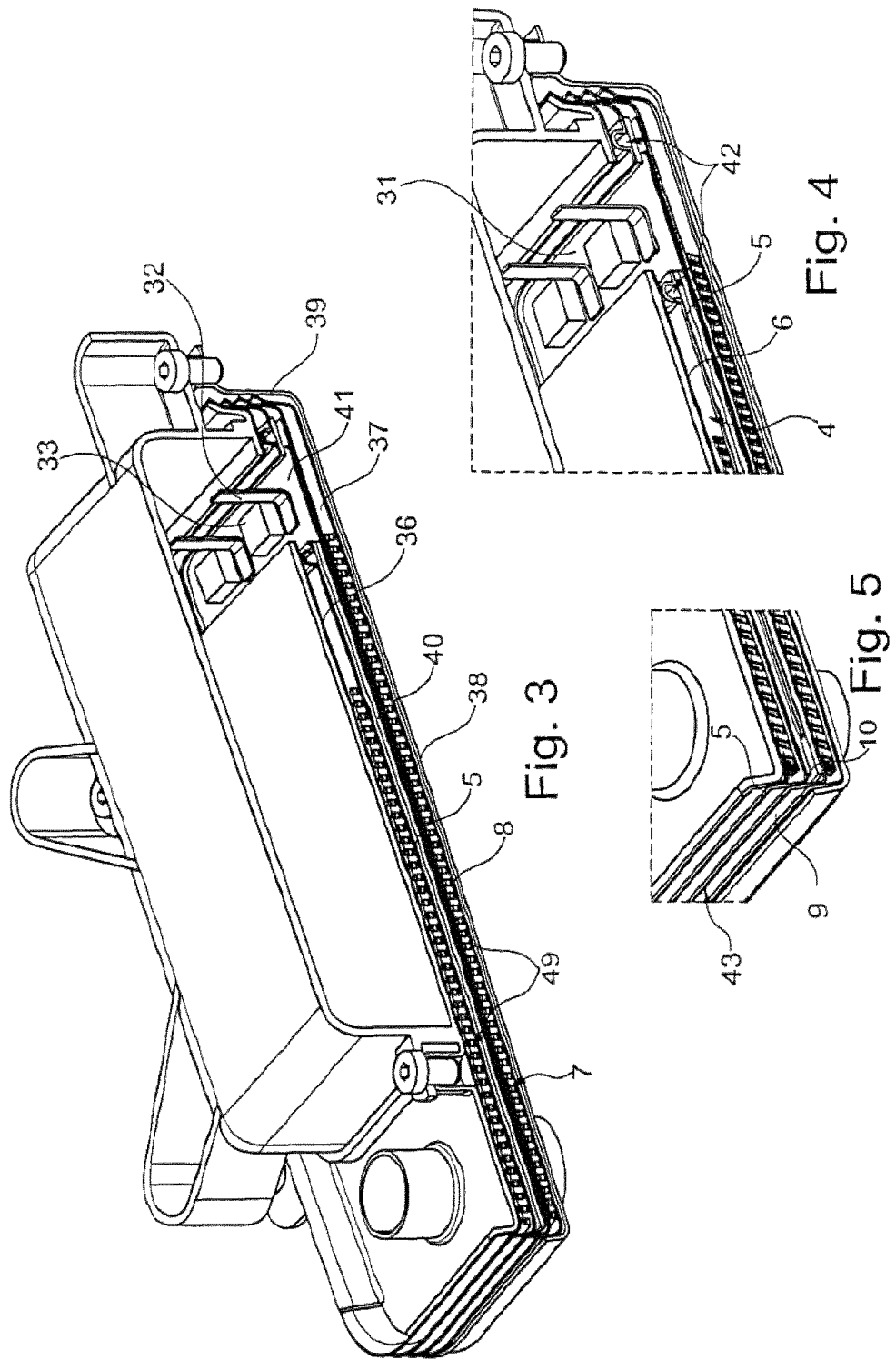

HEATING DEVICE

This nonprovisional application is a continuation of International Application No. PCT/EP2013/065630, which was filed on Jul. 24, 2013 and which claims priority to the European Patent Application No. EP 12290255.4 which was filed on Jul. 24, 2012 and which are both herein incorporated by reference.

BACKGROUND OF THE INVENTION

Field of the Invention

The present invention relates to a heating device, particularly for motor vehicles.

Description of the Background Art

Heating devices, particularly heating devices with electrical heating elements, are known in the conventional art. In this regard, heating devices have also become known which can be used in high-voltage applications up to about 400 V. Care must be taken in the case of such heating devices that in the event of leakage none of the fluid to be heated comes into contact with the voltage-carrying parts of the electrical heating elements, so that the user of said heating devices is not placed in danger.

WO 2011/085915 A1 discloses an electrical heating device which is suitable for air flow and has electrical heating conductor tracks and channels provided with corrugated fins, whereby a ceramic cover element is provided which is arranged on a passivation layer and is connected in a leak-proof manner to a passivation layer against the penetration of gases or fluids.

Conventional heating devices, however, are less suitable for liquid media, so that further concepts are necessary particularly in regard to electrical insulation.

SUMMARY OF THE INVENTION

It is therefore an object of the present invention to provide a heating device that is improved compared with the conventional art and whereby a separation between the fluid channel and the electrical heating element is realized in an improved manner.

An exemplary embodiment provides a heating device with plates stacked one on top of another, whereby at least one first fluid channel is formed in a fluid-tight manner between a first plate package with a first and a second plate, and whereby an electrical heating element is arranged between a first plate of the first plate package and an additional plate, whereby the electrical heating element is accommodated between the two plates in a sealed manner and is electrically insulated, whereby an inlet-side and an outlet-side fluid connection of the first fluid channel is arranged on the second plate of the first plate package, whereby the electrical heating element has a connection device for electrical contacting, which is connected to the electrical heating element and protrudes through a window in the second plate of the first plate package, whereby the fluid connections and the window are arranged adjacent to opposing lateral edges of the second plate.

At least one second fluid channel can be formed between a second plate package with a first and a second plate in a fluid-tight manner. As a result, flow can occur through a first and a second fluid channel, which are arranged preferably on both sides of the electrical heating element, in order to be able to take the heat conveniently out of the electrical heating element.

In an embodiment, the electrical heating element can be accommodated in a sealed manner between the first plate of the first plate package and the first plate of the second plate package and is electrically insulated. A favorable situation for installation space can be created in this way. In this case, the first and second plate package can be preassembled, for example, in that they are soldered beforehand as a preassembled unit to then be fitted with the electrical heating element and a control unit. This also has the advantage that fluid, flowing in the fluid channels and to be heated by the electrical heating element, does not flow through the space between the two plates in which the electrical heating element is arranged.

It is also advantageous, if an inlet-side and an outlet-side fluid connection of the second fluid channel can be arranged on the second plate of the second plate package. A parallel or serial flow through both fluid channels can be provided in this way.

The first and/or second fluid channel can be formed as dual-flow or multi-flow. This occurs advantageously with the intermediate arrangement of at least one third plate or a plurality of plates between the first plate and the second plate. A higher capacity for the through-flow of a fluid can be achieved, if the fluid can flow parallel or serially through two or more than two flows. It can also be expedient, if turbulence-increasing inserts, so-called turbulence inserts, are provided in a fluid channel or in a flow of a fluid channel. Alternatively, instead of the turbulence inserts, embossings can also be made in the plates, which have a turbulence-increasing effect.

The second plate of the first and/or the second fluid channel can be provided with a reinforcing plate. As a result, the outer closure of the plate package can be reinforced, which helps the fatigue strength and also the assembling of the heating device.

The outlet-side fluid connection of the first fluid channel can be fluidically connected to the inlet-side fluid connection of the second fluid channel. This achieves a serial flow through the two fluid channels, so that the fluid flows through the device twice and can be better heated thereby.

The electrical heating element can be accommodated as an electrical resistive element on a support. As a result, a thin electrical resistive coating element can be applied to a support, which is a ceramic support, for example.

The electrical resistive element can be covered by a cover layer and is electrically insulated. The cover layer in this case can be made of the same material as the support. Advantageously, a ceramic can be used that insulates electrically and nevertheless has good thermal properties.

In an embodiment, at least one electronic component, such as a power electronics component, can be arranged on the support.

In an embodiment, a control unit can be provided, which is arranged on the first plate package or on the reinforcing plate placed on the first plate package and which is electrically connected to the connection device of the electrical heating element. This allows for the control unit to be cooled by the flow of the fluid through the first fluid channel, because the control unit gives off its waste heat to the fluid stream to be heated, which increases the efficiency of the heating device further.

An electrical insulation element can be arranged between a plate and the electrical heating element. The electrical heating element can be insulated as a result, making it also suitable for high-voltage applications with U>60 V.

Further, a flat insulation element can be arranged between a bottom of the plate and the electrical heating element and/or a frame-shaped insulation element is arranged between an upright edge of the plate and the electrical heating element. This improves the insulation of the electrical heating element.

A compensating plate can be provided between the bottom of the plate and the flat insulation element. Said compensating plate improves the thermal connection of the electrical heating element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a view of a heating device according to an embodiment of the invention;

FIG. 2 shows a view of a plate arrangement with a fluid channel and heating element;

FIG. 3 shows a sectional view of a heating device;

FIG. 4 shows a detail of FIG. 3;

FIG. 5 shows a detail of FIG. 3;

FIG. 1 shows a heating device 1 of the invention with plates 2 stacked one on top of another. Plates 2 stacked one on top of another comprise at least one first fluid channel 3, which is formed between a first plate package 4 with a first plate 5 and a second plate 6, whereby fluid channel 3 is formed fluid-tight, in that both plates 5, 6 of first plate package 4 are connected fluid-tight to one another. Preferably, plates 5, 6 lie next to one another at the edge and are there connected fluid-tight, such as, for example, soldered. Furthermore, heating device 1 in this exemplary embodiment has a second fluid channel 7, which is formed fluid-tight between a second plate package 8.

Figure 6:
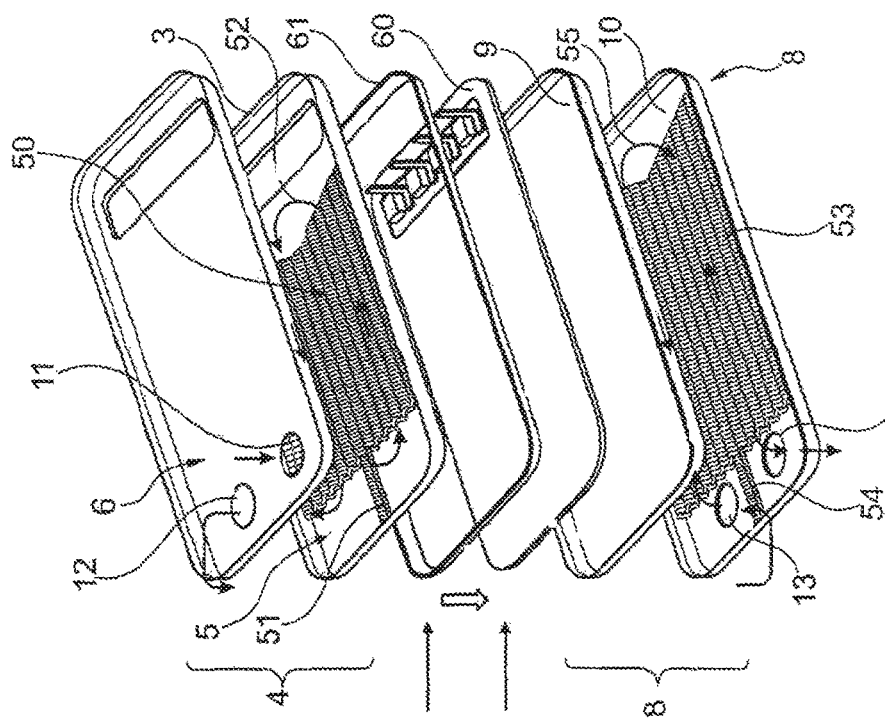
FIG. 6 shows an arrangement of plates in an exploded illustration.

Second plate package 8 is formed by a first plate 9 and a second plate 10. An electrical heating element, which cannot be seen in FIG. 1, however, is arranged between the two plate packages 4, 8. In this regard, the electrical heating element is arranged between a first plate 5 of first plate package 4 and a first plate 9 of second plate package 8. In this case, the electrical heating element is sealed and accommodated electrically insulated between these two plates 5, 9, namely, first plate 5 of first plate package 4 and first plate 9 of second plate package 8.

The heating device thus has two fluid channels 3, 7, a first fluid channel 3 arranged above or to one side of the electrical heating element, and a second fluid channel 7 that is arranged below or on the opposing side of the electrical heating element.

Plate packages 4, 8, which form fluid channels 3, 7 between them, are each formed with one inlet-side and outlet-side fluid connection 11, 12, 13, 14, whereby inlet-side fluid connection 11 conducts the fluid into first fluid channel 3 and outlet-side fluid connection 12 conducts the fluid out of first fluid channel 3. Fluid inlet 13 then conducts a fluid into second fluid channel 7 and fluid outlet 14 again conducts the fluid out of second fluid channel 7. Tube connecting pieces, which allow connection to a fluid line system, are connected to fluid inlet 11 and fluid outlet 14. This allows for the fluid conducted through heating device 1 to be supplied to another circuit.

A fluid connection 15 is provided between fluid outlet 12 and fluid inlet 13, whereby said connection is formed, for example, as a tube line and thereby fluidically connects the outlet of first fluid channel 3 with the inlet of second fluid channel 7. As a result, flow runs through both fluid channels serially.

It can be seen, furthermore, that a reinforcing plate 16 is arranged on the top plate of the plate stack, a reinforcing plate 17 likewise being arranged below the lowest plate. In a further exemplary embodiment, only one reinforcing plate may be provided on the top or the lowest plate of the plate stack or no reinforcing plate at all.

The fluid connections, if there is a reinforcing plate 16, 17, are connected to reinforcing plate 16, 17, whereby without a reinforcing plate the fluid connections are connected directly to the top or lowest plate of the plate stack.

It can be recognized, furthermore, that a control unit 18 is arranged on the top plate or on the respectively placed reinforcing plate 16. Control unit 18 has a housing 19, which accommodates and protects the electronic components of control unit 18. To this end, the housing is formed sealed, for example.

Housing 19 of control unit 18 has lateral extensions 20, which are used for attaching control unit 18 and for bracing the plate stack. For this purpose, either on the lower reinforcing plate or separately from it, but surrounding the lowest stacking plate or the lower reinforcing plate, at least one but advantageously two retaining brackets 21 are provided, which can be connected to mounting lugs 20. For example, the mounting lugs can be screwed together with the retaining brackets, so that the associated contact pressure on the plates of the plate stack can be set. Alternatively, a different form-fitting connection can also be provided.

The plates of the exemplary embodiment are formed in the manner of stacking plates, whereby a plate has a substantially planar bottom and a circumferential edge raised on one side, whereby the edge is raised by less than 90° relative to the plane of the bottom, forming an inclination to the perpendicular. If two plates are stacked one on top of another, the planar bottoms assume a distance to one another and the channel formed thereby is circumferentially close, for example, by soldering.

It is conceivable that a plate package also comprises more than two plates.

FIG. 2 shows the arrangement of plate stack 30 according to FIG. 1, whereby control unit 18 is placed on reinforcing plate 16. It is evident in the right portion of the figure that in reinforcing plate 16 and in the plates of the first fluid channel below it, i.e., in the first plate package with first and second plate 5, 6, a window 31 is formed through which connecting devices 32 of the electrical heating element penetrate that are used to contacting the electrical heating element with control unit 18. Furthermore, in said window 31 preferably electronic components 33 of the electrical heating element are visible that are arranged, for example, on the electrical heating element as power electronics components, in order to achieve good thermal coupling to the fluid channel to be heated. Because the fluid traversing the fluid channel has a considerably lower temperature than the temperature of the power electronics components 33, these can be effectively cooled by the fluid stream of the fluid channel.

It can be seen in FIG. 2 that window 31 in plate package 4 and in reinforcing plate 16 is arranged adjacent to one lateral edge 34, whereby connections 11, 12 of the fluid channel of plate package 4 are arranged adjacent to another lateral edge 35, whereby window 31 and connections 11, 12 are arranged on opposite lateral edges 34, 35 of the second plate or first plate package 4. This has the advantage that fluid connections 11, 12 are arranged away from the electrical connections of the electrical heating element.

FIG. 3 shows a section through the heating device of the invention according to FIGS. 1 and 2, whereby it can be seen that a channel 36, 37, which is used for the through-flow of the fluid, is provided between first plate package 4 and second plate package 8. The plates of plate package 8 are formed as stacking plates with a flat planar bottom 38 and an upright edge 39, whereby the nested plates touch at the edge and are there soldered leak-proof.

Electrical heating element 40 is arranged between first plate 5 of first plate package 4 and first plate 9 of second plate package 8. Electrical heating element 40 in this case preferably has a support 41 bearing an electrical resistive element, whereby support 41 preferably also has connection device 32, which can be for example electrical contacts or plugs, and optionally power electronics components 33.

FIG. 4 again shows in a detail the formation of window 31, whereby first plate 5 has a circumferential raised edge 42, which borders second plate 6 of first plate package 4 and is soldered leak-proof, so that fluid channel 3 is sealed by the soldered connection between the circumferential projection and overlying plate 6.

FIG. 5 once again shows a detail of FIG. 3. It is visible here that a sealing element 43 is inserted between first plate 5 of first plate package 4 and first plate 9 of second plate package 8 at the circumferential upright wall, in order to seal outwardly the area for accommodating the electrical heating element. This seal can be a circumferential plastic part or rubber part, for example, buy it can also be sealed by an adhesive.

Figure 7:
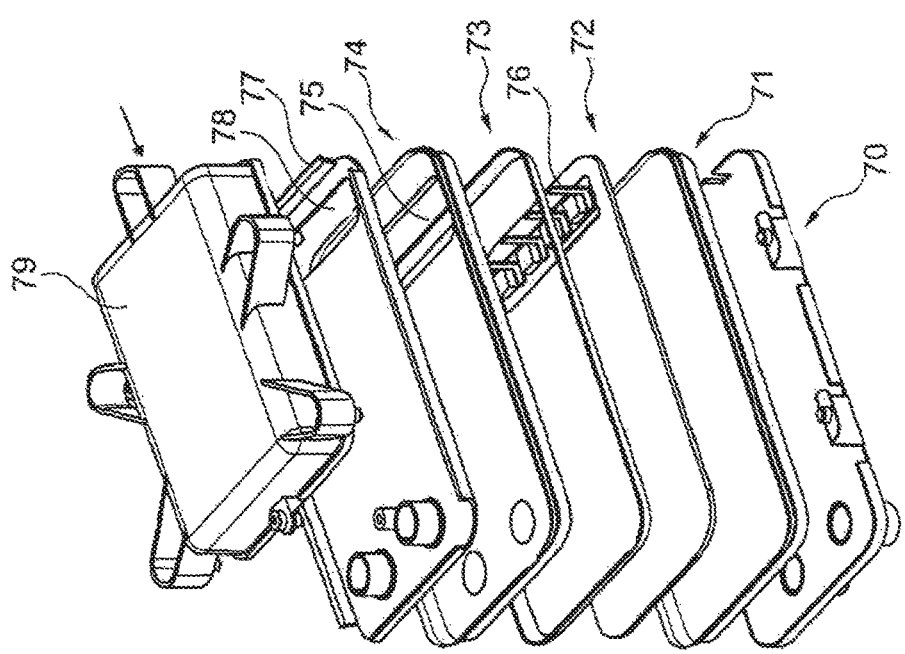
FIG. 7 shows an arrangement of plates in an exploded illustration.

FIG. 6 and FIG. 7 show the arrangement of the plate elements and the plate packages to construct the device of the invention according to FIG. 1. In FIG. 6, first plate 5 of first plate package 4 and second plate 6 of first plate package 4 can be seen that are stacked on top of one another with the intermediate layer of a turbulence insert 50. In this case, a flow directing element 51 is provided in plate 6, so that the fluid entering through inlet 11 flows lengthwise along plate 5 or 6, is redirected at the opposite end, and flows back again to outlet 12 and from there leaves fluid channel 3. Second plate package 8 is formed by first plate 9 and second plate 10, which are again connected together with intermediate layer of turbulence insert 53, whereby plate 10 also has flow directing elements 54, so that the fluid which flows in through inlet 13 flows in longitudinal direction along plate 10, is redirected at the opposite end according to arrow 55, and then flows back again to outlet 14. Electrical heating device 60 is introduced between plate 5 and plate 9, therefore between first plate 5 of first plate package 4 and first plate 9 of second plate package 8, whereby electrical heating element 60 is electrically insulated from plates 5, 89 and insulation and seal 61 are inserted for sealing electrical heating element 60 also relative to the edge of the plates.

It can be seen in FIG. 7 that, viewed from bottom to top, a reinforcing plate 70 is arranged. A second plate package 71 is arranged above it. Electrical heating element 72 with insulation and seal 73 is arranged above this. On top, first plate package 74 with window 75 is arranged, so that connection device 76 of electrical heating element 72 can protrude through window 75. Above this, a reinforcing plate 77 is arranged with window 78, so that again connection device 76 can protrude through window 78, whereby electrical control unit 79 is placed on the top reinforcing plate 77 in order to contact the connection device of electrical heating element 72.

Figure 8:
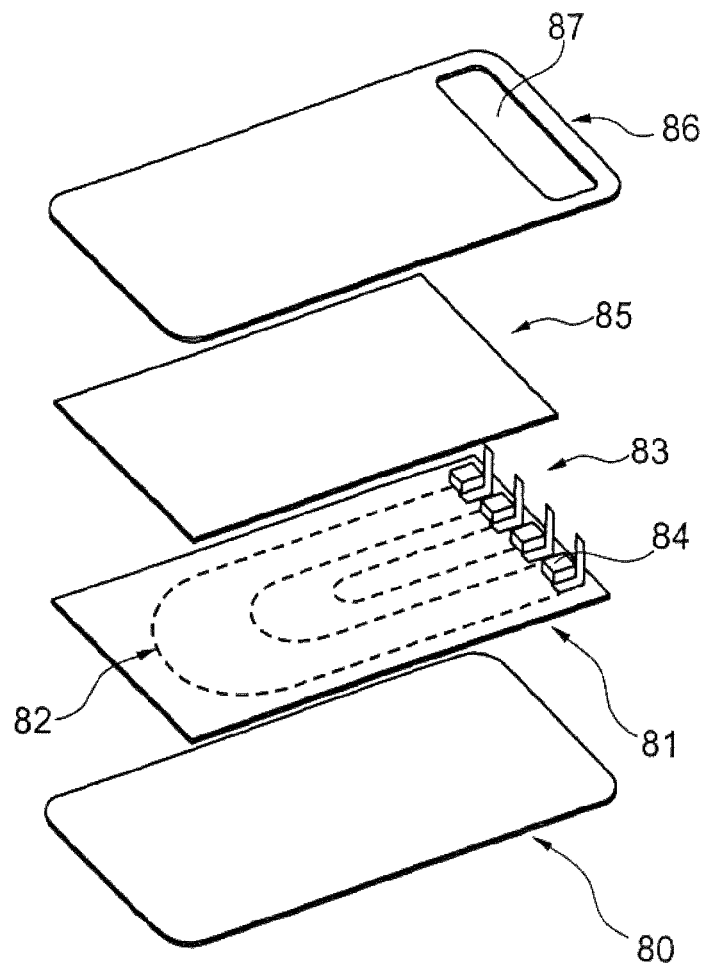
FIG. 8 shows an arrangement of elements of the heating device.

FIG. 8 shows a bottom compensating plate 80, on which support 81 of the electrical heating device is placed that bears electrical resistive layer 82. Furthermore, support 81 bears connection device 83 and optionally electronic components 84, such as power semiconductors. An insulation element 85 such as, for example, insulation ceramics, is arranged above this, which, for example, is of the same material as support 81. This serves as the electrical insulation of the resistive layer. A compensating plate 86 can again be arranged above this, whereby compensating plate 86 has a window 87 for the passing through of connection device 83 of the electrical heating element. The compensating plate is used here for better thermal coupling and allows a mechanical compensation between the electrical heating element and the overlying or underlying plate.

Figure 9:
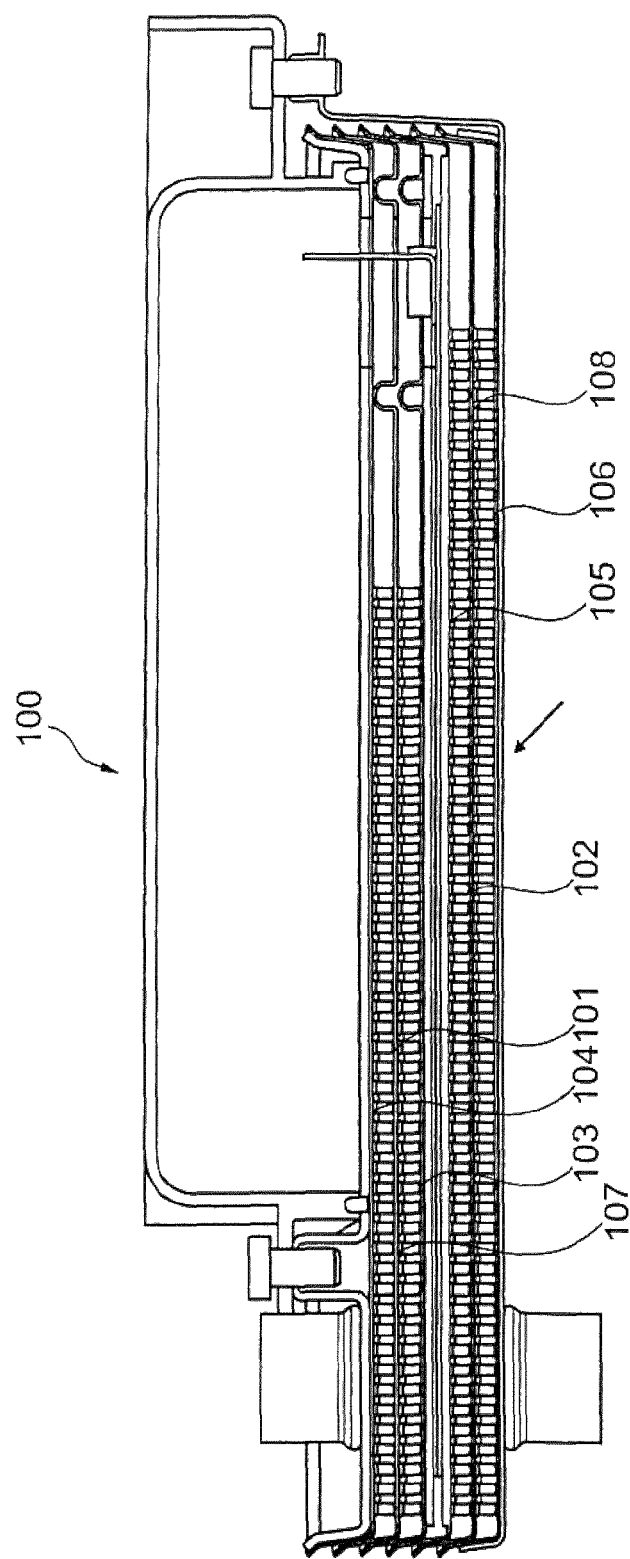
FIG. 9 shows a sectional view of a heating device.

FIG. 9 shows a further exemplary embodiment 100 of the heating device of the invention, in which the first and second plate packages 101, 102 are of multi-flow design, whereby plate packages 101, 102 have a first plate 103 and a second plate 104 or a first plate 105 and a second plate 106, whereby an intermediate plate 107 or 108 is arranged between these plates 103, 104 or 105, 106 to create a multi-flow structure of the flow channel. Alternatively a plurality of intermediate plates can also be provided.

The heating device of the invention can also be formed with only one fluid channel with only the first fluid channel to be connected to the electrical heating element. The second fluid channel can also be omitted depending on the heating requirement.

The arrangement of the electrical heating element between two plates is especially preferred, because the electrical heating element can thereby be electrically insulated from the environment by the insulation materials, whereby the area for accommodating the electrical heating element can be sealed simultaneously. The electrical heating element can here be formed with a support and a resistive layer applied thereon, whereby the resistive layer can be covered by a cover element and thus can be electrically insulated. Preferably, the support and the cover element are made of ceramic, because this approach provides good thermal conductivity with a simultaneously good electrical insulation, so that the electrical heating element, although electrically insulated, is nevertheless thermally well coupled to the adjacent plates.

Here, the electrical resistive layer can be a single electrical resistive layer that can be switched by a power switch. But a plurality of electrical resistive layers can also be provided that can be operated electrically parallel or serially. These can then each be controlled by their own electrical power semiconductor switch allowing for a modulation of the electrical heating power. These layers can then be provided next to one another on the support. Alternatively, the layers can also be arranged electrically insulated on top of one another.

The structure of the plate packages or stack of plates is preferably formed by so-called stacking plates, which are stacked one on top of another having a planar base body and an upright edge. Use of stacking plates, which are placed one on top of another and are soldered together, can assure that the fluid channels arranged between them are formed in a sealed manner. An arrangement of the electrical heating element between two stacking plates connected together and sealed is preferable, since the electrical heating element does not come into contact with a fluid channel that is then arranged on an opposite side of a plate, however. It turned out that in case the edge region of a fluid channel is not soldered leak-proof, the fluid can escape at the edge region of the plate package where the soldered seam is, whereby the fluid then leaks to the outside and does not flow in the direction to the electrical heating device. This would assure that the electrical heating device is not short-circuited by the fluid in the event of leakage of a plate package.

With respect to the manufacturing method, it can be advantageous for the plate packages to be formed as a preassembled unit which, soldered together, provide fluid channel. The connections are formed by openings in the plates and, for example, with connecting pieces that have been soldered on. Preferably an insert can be provided between two plates as a turbulence-generating turbulence insert, for example.

The contacting between the electrical heating device and a plate is promoted, if the plate is as flat as possible. This is promoted further, if a turbulence insert is arranged in a fluid channel, as this creates a very stable flat design. Nevertheless, it can be expedient, if a thermally conductive paste is arranged between the heating device and an adjacent plate to assure an advantageous heat transfer.

Alternatively, the plates can also have embossings in the manner of dimples or winglets projecting inward in the direction of the fluid channel. This may replace the use of a turbulence insert.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A heating device comprising:
   a first fluid channel formed in a fluid-tight manner between a first plate and a second plate of a first plate package;
   a second fluid channel formed in a fluid-tight manner between a first plate and a second plate of a second plate package, the first plate package being stacked on top of the second plate package;
   an electrical heating element arranged between the first plate of the first plate package and the first plate of the second plate package, the electrical heating element being accommodated between the first plate of the first plate package and the first plate of the second plate package in a sealed manner and being electrically insulated; and
   an inlet-side and an outlet-side fluid connection of the first fluid channel arranged in the second plate of the first plate package, the inlet-side fluid connection and the outlet-side fluid connection of the first fluid channel each formed as a through hole in the second plate of the first plate package,
   wherein the electrical heating element has a connection device for electrical contacting, which is directly connected to the electrical heating element, the connection device extending perpendicularly from an upper surface of the electrical heating element in a direction towards the first plate package, the upper surface of the electrical heating element opposing a bottom surface of the first plate of the first plate package, such that when the first plate package is stacked on top of the electrical heating element, the connection device of the electrical heating element protrudes through a window in the first plate package,
   wherein the second plate of the first plate package has a first end having a first lateral edge and a second end having a second lateral edge, the first end and the first lateral edge opposing the second end and the second lateral edge,
   wherein the inlet-side and the outlet side fluid connections are arranged closer to the first lateral edge of the first end of the second plate of the first plate package than to the second lateral edge of the second end and the window is arranged closer to the second lateral edge of the second end of the second plate of the first plate package than to the first lateral edge of the first end,
   wherein when the first plate package is stacked on top of the second plate package, the first plate of the first plate package is arranged closer to the first plate of the second plate package than to the second plate of the second plate package,
   wherein when the first plate package is stacked on top of the second plate package, the first plate of the first plate package is positioned between the second plate of the first plate package and the electrical heating element, and
   wherein the through hole of the inlet-side fluid connection and the through hole of the outlet-side fluid connection of the second plate of the first plate package each extend from an upper surface to a bottom surface of the second plate of the first plate package, the bottom surface of the second plate of the first plate package opposing an upper surface of the first plate of the first plate package.

2. The heating device according to claim 1, further comprising an inlet-side and an outlet-side fluid connection of the second fluid channel that are arranged in the second plate of the second plate package, the inlet-side fluid connection and the outlet-side fluid connection of the second fluid channel each formed as a through-hole in the second plate of the second plate package,
   wherein the through hole of the inlet-side fluid connection and the through hole of the outlet-side fluid connection of the second plate of the second plate package each extend from an upper surface to a bottom surface of the second plate of the second plate package, the upper surface of the second plate of the second plate package opposing a bottom surface of the first plate of the second plate package.

3. The heating device according to claim 1, wherein at least one of the first fluid channel or the second fluid channel are formed as dual-flow or multi-flow with an intermediate arrangement of at least one third plate or a plurality of plates between the first plate and the second plate of the first plate package or between the first plate and the second plate of the second plate package.

4. The heating device according to claim 1, wherein the second plate of the first plate package and the second plate of the second plate package are each provided with a respective reinforcing plate.

5. The heating device according to claim 2, wherein the outlet-side fluid connection of the first fluid channel is in fluid communication with the inlet-side fluid connection of the second fluid channel.

6. The heating device according to claim 1, wherein the electrical heating element is an electrical resistive element on a support.

7. The heating device according to claim 6, wherein the electrical resistive element is covered by a cover layer and is electrically insulated.

8. The heating device according to claim 6, wherein at least one electronic component or a power electronics component is arranged on the support.

9. The heating device according to claim 1, wherein a control unit is provided, which is arranged on the first plate package or on a reinforcing plate placed on the first plate package and which is electrically connected to the connection device of the electrical heating element.

10. The heating device according to claim 1, wherein an electrical insulation element is arranged between the first plate of the first plate package and the electrical heating element.

11. The heating device according to claim 10, wherein the electrical insulation element is a flat insulation element that is arranged between a bottom of the first plate of the first plate package and the electrical heating element.

12. The heating device according to claim 11, wherein a compensating plate, that is a plate-shaped element and that improves a thermal connection of the electrical heating element, is arranged between the bottom of the first plate of the first plate package and the flat insulation element.

13. The heating device according to claim 10, wherein the electrical insulation element is an element having a frame shape with an opening in the center and is arranged between an upright edge of the first plate of the first plate package and the electrical heating element.

14. The heating device according to claim 10, wherein the electrical insulation element includes:

a flat insulation element that is arranged between a bottom of the first plate of the first plate package and the electrical heating element, and an element having a frame shape with an opening in the center that is arranged between an upright edge of the first plate of the first plate package and the electrical heating element.

15. The heating device according to claim 1, wherein the first plate of the second plate package is positioned between the second plate of the second plate package and the electrical heating element.

16. The heating device according to claim 1, wherein an outer periphery of the first plate of the first plate package is provided with bent edges and an outer periphery of the second plate of the first plate package is provided with bent edges, an outer side surface of the bent edges of the second plate connecting to an inner side surface of the bent edges of the first plate when the second plate is stacked on top of the first plate.

* * * * *